United States Patent
Siddall

[15] 3,697,549
[45] Oct. 10, 1972

[54] 2,3-CYCLOETHYLENE-3-METHYLPENTANO-5-LACTONE

[72] Inventor: John B. Siddall, Palo Alto, Calif.

[73] Assignee: Zolcon Corporation, Palo Alto, Calif.

[22] Filed: June 25, 1971

[21] Appl. No.: 156,943

Related U.S. Application Data

[62] Division of Ser. No. 880,966, Nov. 28, 1969.

[52] U.S. Cl.........260/343.2 R, 260/343, 260/611 F, 260/488 R
[51] Int. Cl. ................................................C07d 7/06
[58] Field of Search................................260/343.2 R

[56] References Cited

UNITED STATES PATENTS 3,010,997   11/1961   Robinson et al........260/343.2

Primary Examiner—John M. Ford
Attorney—Donald W. Erickson

[57] ABSTRACT

Synthesis of cis 2-(1'-methyl-2'-isopropenylcyclobutyl)ethanol, a component of the boll weevil sex attractant, and intermediates therefor, in which 5-hydroxypent-2-ynoic acid or ethers thereof is methylated followed by cyclization to yield 3-methylpent-2-eno-5-lactone which is irradiated in presence of ethylene to yield 2,3-cycloethylene-3-methylpentano-5-lactone which is cleaved and converted into 2-(1'-methyl-2'-isopropenylcyclobutyl)ethanol.

1 Claim, No Drawings

2,3-CYCLOETHYLENE-3-METHYLPENTANO-5-LACTONE

This is a division of application Ser. No. 880,966, filed Nov. 28, 1969.

The present invention relates to the synthesis of cis 2-(1'-methyl-2'-isopropenylcyclobutyl)ethanol, one of three essential components of the male boll weevil's sex attractant, and intermediates therefor. The components of the male boll weevil's sex attractant have been reported in *Chemical & Engineering News*, 36–38, Apr. 28, 1969.

It is an object of the present invention to provide a synthesis for the preparation of cis 2-(1'-methyl-2'-isopropenylcyclobutyl)ethanol and key intermediates therefor which uses readily available starting materials and is economical to practice. Other objects and advantages will become apparent as the invention is hereinafter described in detail.

In the practice of the invention, there is first prepared the lactone III (3-methylpent-2-eno-5-lactone) which is outlined as follows:

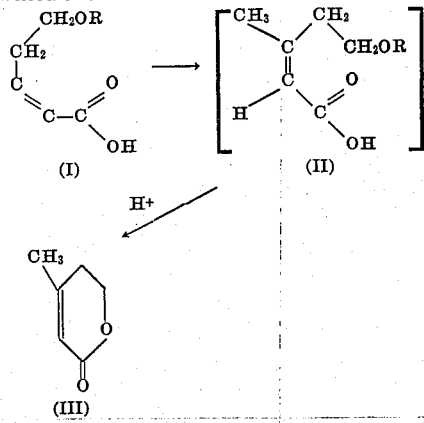

In the above formulas, R represents an acid labile group, such as tetrahydropyran-2-yl, tetrahydrofuran-2-yl, t-butyl, and the like.

The lactone (III), a key intermediate, in accordance with the present invention is prepared in essentially one step in that cyclization of the intermediate (II) is accomplished by treatment with acid during the work-up for isolation of the lactone. Methylation of 5-hydroxypent-2-ynoic acid (I) or the ether thereof is accomplished by treatment with dimethylcopper lithium in an organic solvent inert to the reaction. There is used at least one molar equivalent of dimethylcopper lithium or a slight excess. The preparation of the dimethylcopper lithium reagent is carried out at low temperatures of the order of about room temperature to about $-150°$ C, preferably from about $0°$ C to about $-100°$ C in an organic solvent medium inert to the reaction, such as ethers, hydrocarbons, and the like, e.g. pentane, ether, tetrahydrofuran, monoglyme, toluene, diglyme and dioxane, and mixtures thereof, such as ether:pentane, ether:hexane, and the like. Instead of isolating the dimethylcopper lithium reagent, it is preferable to add the acetylenic acid (I) to the prepared solution of the reagent while maintaining a low temperature and preferably under inert atmosphere, such as argon or nitrogen. The reaction is complete in a matter of minutes to a few hours depending primarily on the solvent medium. The reaction mixture is then made acid by the addition of a proton donor, such as an inorganic or organic acid, such as hydrochloric acid, sulfuric acid, phosphoric acid, oxalic acid, acetic acid, p-toluenesulfonic acid, preferably dilute aqueous acid, such as aqueous hydrochloric acid or aqueous sulfuric acid. If the hydroxyl group of the acetylenic acid (I) bears an ether group, the choice of proton donor will depend upon the relative ease with which the ether group is removed. The lactone can be used as the crude product or purified by distillation prior to irradiation with ethylene.

Methylation of the acetylenic acid (I) in accordance with the present invention can also be accomplished using methyl copper or a complex formed from the reaction of cuprous salt with methylmagnesium halide, i.e., bromide, chloride or iodide. Cuprous salt, such as cuprous iodide, cuprous bromide, cuprous chloride, cuprous acetate or cuprous cyanide is generally used. Methyl copper is prepared using equimolar amounts of a cuprous salt, such as cuprous iodide and methyl lithium. Similarly, the complex formed from cuprous salt and methylmagnesium halide is prepared using equimolar amounts. In such instance and particularly in the case of methyl copper, it is advantageous to employ a solubilizing ligand, such as phosphine, phosphite, secondary amine or tertiary amine to improve the organic solvent solubility and reactivity of the reagent. Suitable ligands include tri-n-butyl phosphine, triethylphosphite, pyrrolidine, piperadine, trimethylphosphine, diethylamine, and the like. The ligand should be present in the amount of at least one molar equivalent based on the cuprous salt employed in the reaction mixture; however, in the case of the complex formed from cuprous salt and methylmagnesium halide, two molar equivalents of the ligand should be employed. Preparation of the methylation reagent is accomplished using the conditions and procedure described hereinabove for the preparation of dimethylcopper lithium.

The lactone (III) is then treated with ethylene under photochemical addition conditions to yield the 2,3-cycloethylene-3-methylpentano-5-lactone (IV).

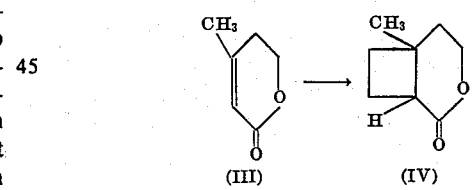

Photochemical addition of ethylene to the lactone (III) is accomplished by irradiating a solution of the lactone (III) in an organic solvent inert to the reaction which is saturated with ethylene. Suitable inert organic solvents include ethers, alcohols, halogenated hydrocarbons and hydrocarbons, such as ether, tetrahydrofuran, benzene, hexane, cyclohexane. Depending upon the concentration of the reaction solution, temperature, solvent and light source, the reaction is complete within a few minutes to several hours. Suitable sources off light include sunlight and electric light means, such as conventional fluorescent light, mercury arc light, and the like. The effective wavelength appears to be in the *uv* range of from about 200 mu. to about 400 mu. Filters, such as Pyrex and quartz, may be used in conjunction with sensitizers, such as acetophenone, benzophenone, and the like.

The photochemical addition can be carried out at room temperature, although higher and lower temperatures can be employed, generally temperatures below room temperature are used. The concentration of the lactone (III) in the solvent medium should always be considerably less than the concentration of ethylene, generally less than 5 percent.

The lactone (IV) is then cleaved and converted into cis (1'-methyl-2'-isopropenylcyclobutyl)ethanol according to the following outlined procedure.

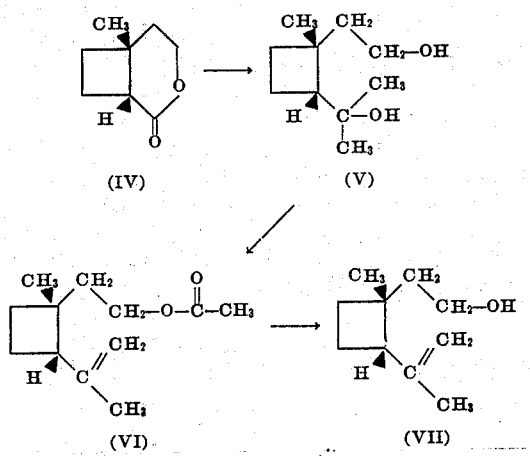

In the practice of the above process, the lactone (IV) is reacted with methyl lithium in ether to yield the diol (V) which is treated with acetic anhydride with heat to yield the acetate (VI). Hydrolysis of the acetate using alkali metal hydroxide, or the like, in alcohol affords the desired alcohol (VII).

The compounds of formula I wherein R is an acid labile group, such as tetrahydropyran-2-yl, tetrahydrofuran-2-yl or t-butyl, can be prepared by standard procedures. Tetrahydropyran-2-yl ether and tetrahydrofuran-2-yl ether can be prepared by treating the hydroxyl compound with dihydropyran and dihydrofuran, respectively, in the presence of hydrochloric acid. The t-butyl ether can be prepared by treating the hydroxyl compound with isobutene in the presence of sulfuric acid.

The following examples are provided to illustrate the present invention. Temperature in degrees Centigrade.

EXAMPLE 1

To a mixture of 950 mg. of cuprous iodide in 80 ml. of dry ether is added at −20° in an argon atmosphere, 5.9 ml. of a 1.67 M ethereal methyl lithium solution.

To the above prepared solution is added at −100° a solution of 550 mg. of 5-hydroxypent-2-ynoic acid in 20 ml. of ether. After about 30 minutes, 1 ml. of water is added and the mixture allowed to rise to room temperature. To the mixture is added aqueous hydrochloric acid until acidic with stirring. Then the mixture is filtered and the filtrate washed with brine and water and dried over sodium sulfate. The ether is evaporated under reduced pressure to yield 3-methylpent-2-eno-5-lactone (III) which can be purified by distillation.

EXAMPLE 2

A solution of 1 g. of 3-methylpent-2-eno-5-lactone in 50 g. of benzene is saturated with ethylene. The solution, while continuing to introduce ethylene, is irradiated using a medium pressure mercury vapor lamp (450 watts) with Pyrex filter for about 4 hours. Then the reaction mixture is evaporated under reduced pressure to yield 2,3-cycloethylene-3-methylpentano-5-lactone (IV) which can be purified by distillation.

EXAMPLE 3

To a solution of 1 g. of 2,3-cycloethylene-3-methylpentano-5-lactone in ether is added two molar equivalents of methyl lithium in ether with stirring at about 0°. The mixture is stirred for about 60 minutes and allowed to rise to room temperature. The mixture is diluted with aqueous ammonium chloride and water and separated. The organic phase is washed with water, dried over sodium sulfate and evaporated under reduced pressure to yield the diol (V) which can be purified by distillation.

A mixture of 1 g. of the diol (V) and 5 ml. of acetic anhydride is heated at reflux for about 2 hours. The mixture is cooled and diluted with saturated NaCl, water and then ether. The organic phase is washed with brine and water, dried over sodium sulfate and evaporated under reduced pressure to yield the acetate (VI).

A mixture of 1 g. of the acetate (VI) and 0.1 g. of potassium hydroxide in methanol is stirred for about 2.5 hours. The mixture is diluted with water and then ether. The organic phase is washed with water, dried over sodium sulfate and evaporated to yield the monohydric alcohol (VII) which can be purified by distillation.

What is claimed is:

1. A compound of the following formula:

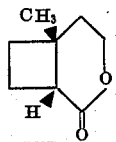

* * * * *

UNITED STATES PATENT OFFICE
CERTIFICATE OF CORRECTION

Patent No. 3,697,549                    Dated October 10, 1972

Inventor(s) JOHN B. SIDDALL

It is certified that error appears in the above-identified patent and that said Letters Patent are hereby corrected as shown below:

In the title page, the Assignee [73] "Zolcon" should read --Zoecon--

Column 1, formula (I), that portion of the formula reading "-C=C-" should read -- -C≡C- --. Column 2, formula (IV), that portion of the formula reading

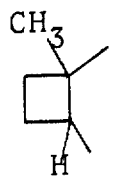   should read   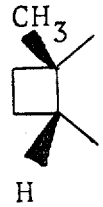

Signed and sealed this 10th day of July 1973.

(SEAL)
Attest:

EDWARD M. FLETCHER, JR.                 Rene Tegtmeyer
Attesting Officer                        Acting Commissioner of Patents